United States Patent
Ahn

(10) Patent No.: US 6,259,576 B1
(45) Date of Patent: Jul. 10, 2001

(54) METHOD AND APPARATUS FOR HARD DISK DRIVE WITH SELF-SERVOWRITING CAPABILITY

(75) Inventor: Young-Sub Ahn, Suwon (KR)

(73) Assignee: SamSung Electronics Co., Ltd., Suwon (KR)

(*) Notice: Subject to any disclaimer, the term of this patent is extended or adjusted under 35 U.S.C. 154(b) by 0 days.

(21) Appl. No.: 09/148,206

(22) Filed: Nov. 26, 1996

(30) Foreign Application Priority Data

Nov. 27, 1995 (KR) ............................................. 43974/1995

(51) Int. Cl.$^7$ ............................ G11B 5/596; G11B 21/10
(52) U.S. Cl. ........................................... 360/75; 360/77.02
(58) Field of Search .................................. 360/75, 77.02, 360/77.05, 77.06, 77.07, 77.08, 77.11

(56) References Cited

U.S. PATENT DOCUMENTS

| | | | |
|---|---|---|---|
| 4,701,815 | * 10/1987 | Yada et al. | 360/77.06 |
| 4,729,048 | * 3/1988 | Imakoshi et al. | 360/77.06 |
| 5,012,363 | 4/1991 | Mine et al. | 360/77.05 |
| 5,162,955 | 11/1992 | Burdenko | 360/77.02 |
| 5,165,082 | 11/1992 | Tomiyama | 360/77.02 |
| 5,202,802 | 4/1993 | Sidman | 360/77.05 |
| 5,241,435 | 8/1993 | Saito et al. | 360/78.04 |
| 5,283,773 | 2/1994 | Thomas et al. | 369/44.26 |
| 5,319,622 | 6/1994 | Martin | 369/44.14 |
| 5,373,402 | * 12/1994 | Price, Jr. et al. | 360/61 |
| 5,375,020 | 12/1994 | Aggarwal et al. | 360/77.08 |
| 5,416,652 | 5/1995 | Lewis | 360/48 |
| 5,434,725 | 7/1995 | Hirose et al. | 360/77.04 |
| 5,448,429 | 9/1995 | Cribbs et al. | 360/75 |
| 5,465,182 | 11/1995 | Ishikawa | 360/75 |
| 5,485,322 | 1/1996 | Chainer et al. | 360/51 |
| 5,500,776 | 3/1996 | Smith | 360/77.04 |
| 5,519,546 | 5/1996 | Lewis | 360/48 |
| 5,541,784 | 7/1996 | Cribbs et al. | 360/75 |
| 5,570,241 | * 10/1996 | Nielsen et al. | 360/46 |
| 5,570,247 | 10/1996 | Brown et al. | 360/75 |
| 5,581,420 | 12/1996 | Chainer et al. | 360/75 |
| 5,612,833 | 3/1997 | Yarmchuk et al. | 360/75 |
| 5,615,058 | 3/1997 | Chainer et al. | 360/51 |
| 5,668,679 | 9/1997 | Swearingen et al. | 360/75 |
| 5,684,972 | 11/1997 | Hill et al. | 395/404 |
| 5,748,398 | 5/1998 | Seo | 360/51 |
| 5,757,574 | 5/1998 | Chainer et al. | 360/75 |
| 5,768,398 | 6/1998 | Janse et al. | 381/103 |

FOREIGN PATENT DOCUMENTS

| | | |
|---|---|---|
| 59-171081 | * 9/1984 | (JP) . |
| 62-188015 | * 8/1987 | (JP) . |
| 3-254411 | * 11/1991 | (JP) . |

OTHER PUBLICATIONS

JP 5–2728A in: Patents Abstracts of Japan P–1541, vol. 17, No. 262, May 24, 1993.

* cited by examiner

Primary Examiner—David L. Ometz
(74) Attorney, Agent, or Firm—Robert E. Bushnell, Esq.

(57) ABSTRACT

A servowriting method for a hard disk drive is performed by detecting a servo-pattern on a first surface of a disk with a trailing coil of a first head slider positioned over the first surface of the disk. The detected servo-pattern is written onto the first surface of the disk with a first leading coil of the first head slider spaced-apart from the trailing coil, while the servo-pattern is simultaneously written onto a second surface of the disk opposite to the first surface with a second leading coil of a second head slider positioned over the second surface.

19 Claims, 4 Drawing Sheets

METHOD AND APPARATUS FOR HARD DISK DRIVE WITH SELF-SERVOWRITING CAPABILITY

CROSS-REFERENCE TO RELATED APPLICATIONS

This application makes reference to, incorporates the same herein, and claims all benefits accruing under 35 U.S.C. §119 arising from an application for Hard Disk Drive With Self-Servowriting Capability earlier filed in the Korean Industrial Property Office on Nov. 27, 1995 and there duly assigned Ser. No. 43974/1995.

BACKGROUND OF THE INVENTION

The present invention relates to a hard disk drive, and more particularly, to a hard disk drive with a self-servowriting capability.

A hard disk drive is widely used as a memory device in a computer, and is generally much lower in price than other memory devices. This is largely due to the fact that the hard disk drive can be constructed from inexpensive components. Accordingly, the hard disk drive can be manufactured at a relatively low cost. A servowriter is an essential device for the hard disk drive, and is used for writing servo information in servo sectors of a recording disk.

A servo sector generally includes a read/write recovery and auto gain control AGC sector for regularly maintaining the time required for a head to change from an operation for writing data to an operation for reading servo information, and for defining the size of a position signal read through the head on an entire disk area. A servo address mark SAM sector provides an area in which a standard pattern for servotiming is written. An index IDX sector is an area for providing disk rotation information. A gray code sector includes address information regarding servo sectors, and head and cylinder numbers. A servo burst sector is provided for controlling on-track positioning of the head.

The servowriter is the highest-priced device of all the devices used in constructing a hard disk drive. Recently, the function of the servowriter has been emphasized in order to increase the writing density and provide the hard disk with a large data storage capacity. The cost of the servowriter, together with the time required for servowriting, have become key elements in determining the cost efficiency of the manufacturing process. A voice coil motor VCM generally used in a hard disk drive system employs an acceleration control method, and therefore, it cannot be maintained in a regular position without the use of a servo-pattern written on the disk surface. Accordingly, in order to write the servo-pattern for controlling the position of the head, a high-priced position control system is required.

Several prior art references discuss the subject of servowriting in a disk recording apparatus. One reference, U.S. Pat. No. 5,162,955 entitled Apparatus For Writing Servo Information Onto A Magnetic Disk issued to Burdenko, discloses an apparatus that seeks to improve the tracking of a head actuator that writes servo information onto a disk surface. In Burdenko '955, a feedback circuit connected between a tracking element and an actuator drive monitors the position of the tracking element as a measure of the radial position of the head for controlling the action of the drive to move the head to selected radial positions within a desired degree of radial accuracy. While conventional art, such as Burdenko '955, provides advantages in its own right, I believe that an improved technique for servowriting in a disk recording apparatus can be contemplated.

SUMMARY OF THE INVENTION

Accordingly, it is an object of the present invention to provide a hard disk drive with a self-servowriting capability.

It is another object to reduce the cost of producing a hard disk drive by eliminating the need for an expensive servowriting device.

It is still another object to provide a device and method capable of minimizing the time, space and effort required for manufacturing a hard disk drive.

To achieve these and other objects, the present invention provides a servowriting method for a hard disk drive. The method is performed by detecting a servo-pattern on a first surface of a disk with a trailing coil of a first head slider positioned over the first surface of the disk. The detected servo-pattern is written onto the first surface of the disk with a first leading coil of the first head slider spaced-apart from the trailing coil, while the servo-pattern is simultaneously written onto a second surface of the disk opposite to the first surface with a second leading coil of a second head slider positioned over the second surface.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1A:
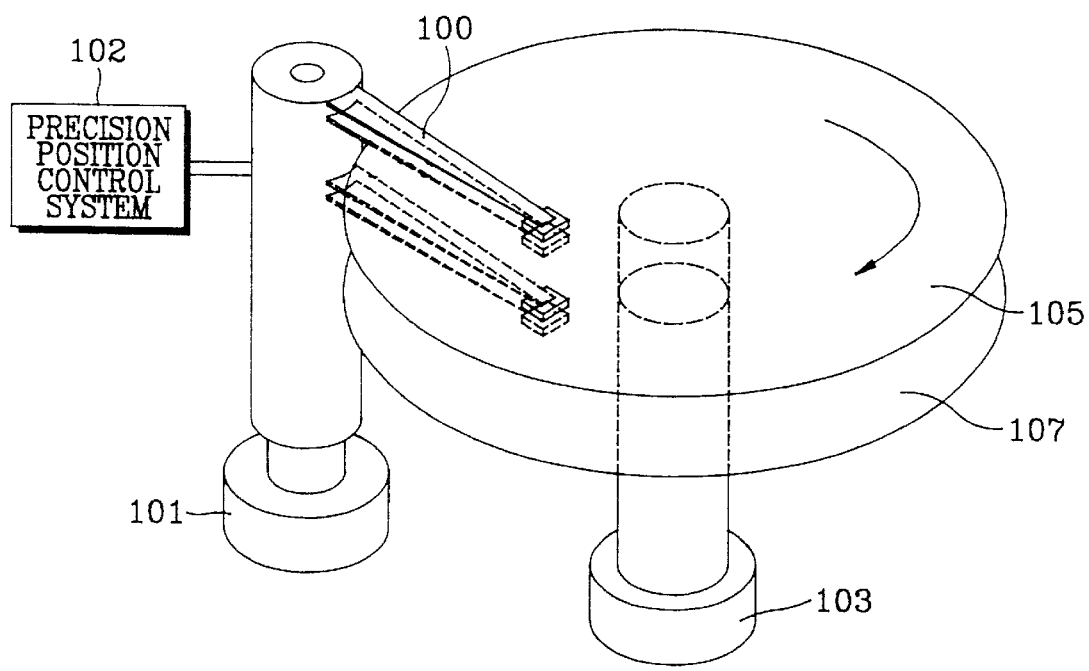
FIG. 1A illustrates a general configuration of a hard disk drive.

Turning now to the drawings and referring to FIG. 1A, a general configuration of a hard disk drive is shown. In FIG. 1A, a precision position control system 102 is provided for controlling the position of heads connected to a head gimbal assembly HGA 100. A voice coil motor VCM 101 is provided for enabling movement of the heads across surfaces of recording disks 105 and 107 as the recording disks 105 and 107 rotate via a spindle motor 103.

Figure 1B:
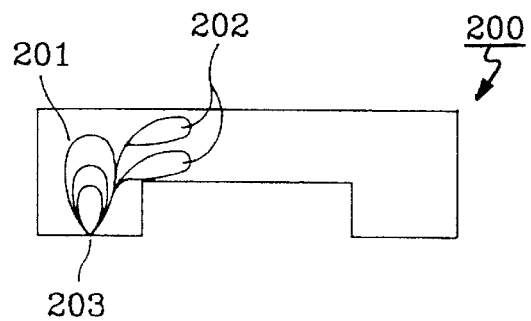
FIG. 1B illustrates a head slider for performing a servowriting operation in the hard disk drive of FIG. 1A.
Figure 2:
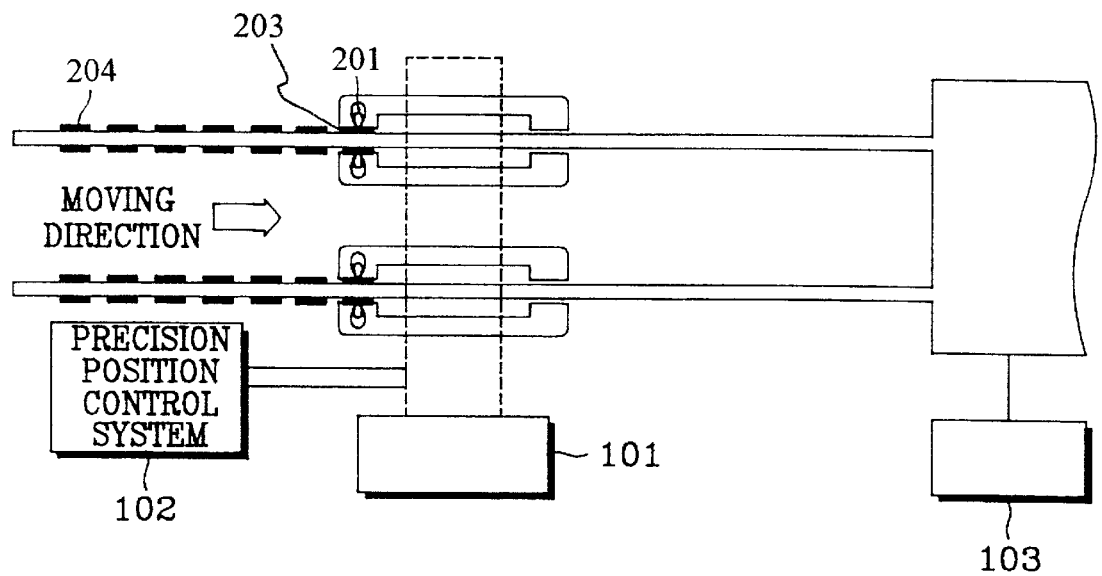
FIG. 2 illustrates a configuration for performing a servowriting operation in the hard disk drive of FIG. 1A.

FIG. 1B illustrates a head slider 200 for performing a servowriting operation in the hard disk drive of FIG. 1A. Head slider 200 of the head gimbal assembly HGA 100 moves with a corresponding head as the head moves at a constant track pitch, and writes a servo-pattern on a corresponding surface of one of the recording disks 105 and 107. As shown in FIG. 1B, head slider 200 includes a coil 201 and a soldering pad 202 for writing the servo-pattern onto a disk surface through a head gap 203. FIG. 2 illustrates an exemplary configuration for performing a servowriting operation in the hard disk drive of FIG. 1A. In FIG. 2, a servo-pattern 204 is written on a disk surface through head gap 203. The minimum time T required for writing the servo-pattern 204 in the above-mentioned manner can be derived from the following equation (1).

$$T=(\text{time req'd for one rotation}+\text{seek time for one track})\times\text{number of tracks} \quad (1)$$

In a general case, the servo-pattern is written twice per data track with a +/-50% offset. Accordingly, the actual time required to write the servo-pattern is twice the value obtained from equation (1).

Hereinafter, the present invention will be described in detail with reference to FIGS. 3 through 6.

Figure 3:
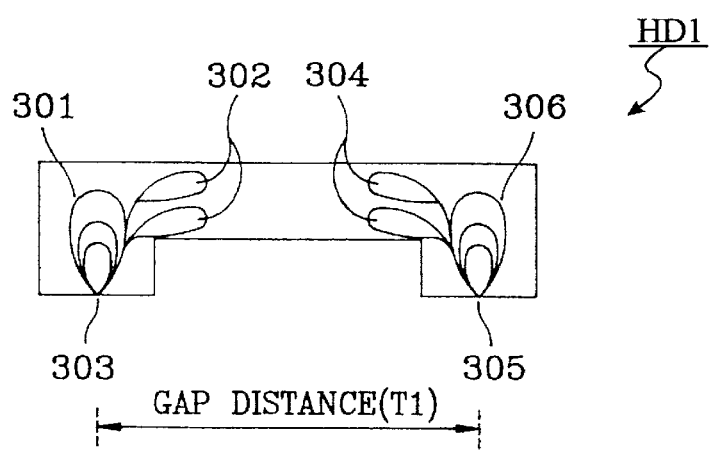
FIG. 3 illustrates a head slider for performing a servowriting operation in accordance with the principles of the present invention.

Referring to FIG. 3, a head slider HD1 for performing a servowriting operation in accordance with the principles of the present invention is shown. Head slider HD1 of FIG. 3 includes first and second coils 301 and 306, and first and second soldering pads 302 and 304. First and second head gaps 303 and 305 exist between ends of first and second coils 301 and 306 and a disk surface. A gap distance T1 defining a distance between ends of the first and second coils 301 and 306 is designed to be an integer multiple of the track pitch. With the head slider HD1 of FIG. 3, read and write operations can be simultaneously performed according to a selection.

Figure 4:
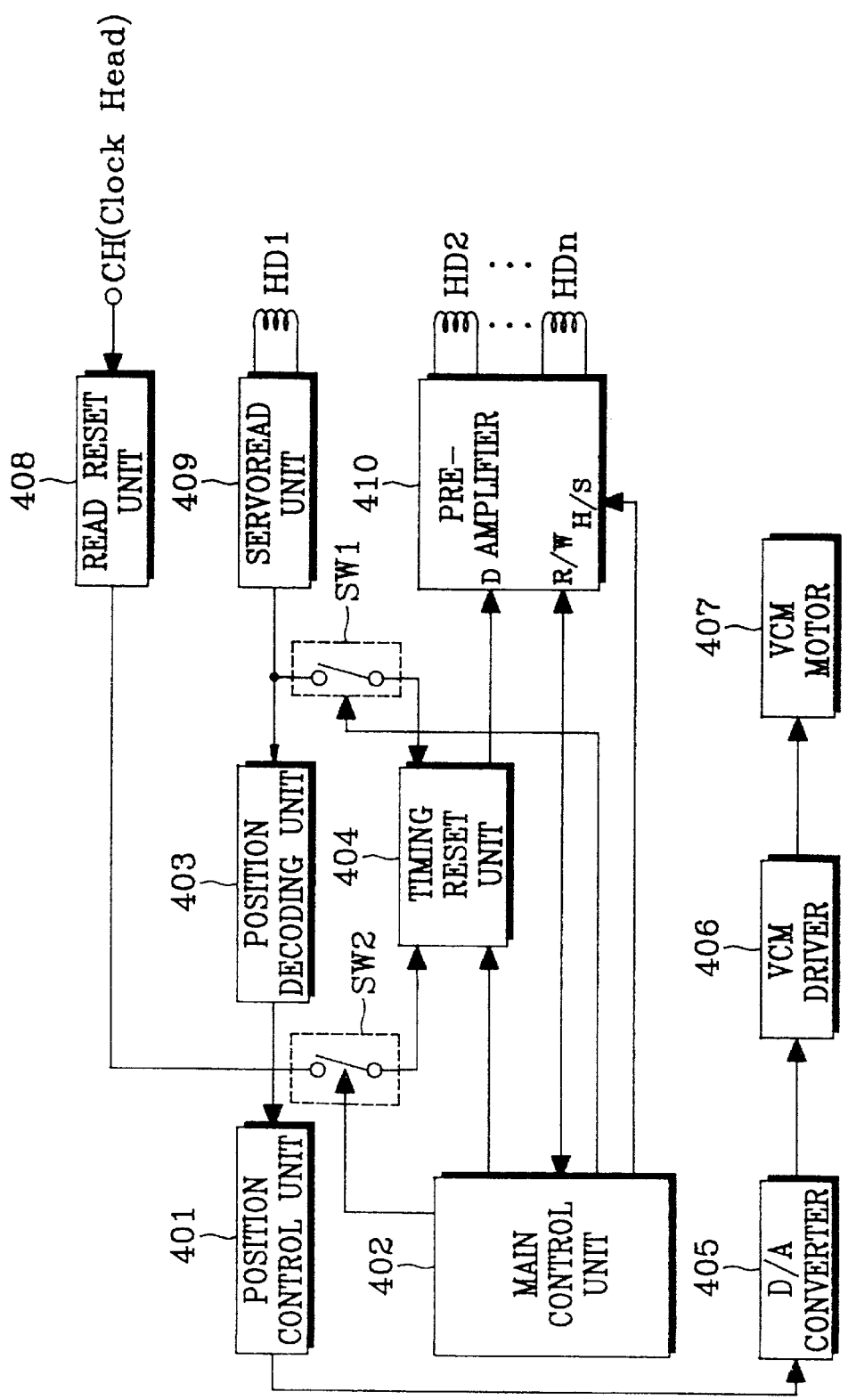
FIG. 4 illustrates a block diagram of a hard disk drive system constructed in accordance with the principles of the present invention.

Referring to FIG. 4, a block diagram of a hard disk drive system constructed in accordance with the principles of the present invention is shown. In FIG. 4, a read reset unit 408 resets a clock of a clock head CH. A servoread unit 409 senses a previously written servo-pattern, and reads a next servo-pattern with reference to the sensed servo-pattern through the head slider HD1. A position decoding unit 403 decodes a servo-pattern signal read by the servoread unit 409. A position control unit 401 receives decoded data from the position decoding unit 403, and then generates position control data for a position control operation. A digital-to-analog D/A converter 405 converts the position control data output from the position control unit 401 into an analog signal. A voice coil motor VCM driver 406 controls a voice coil motor VCM 407 according to the output of the digital-to-analog D/A converter 405. A main control unit 402 controls the overall operation of the hard disk drive. A pre-amplifier 410 enables head sliders HD2–HDn to be selected through a head selecting terminal H/S, and amplifies information to be read from or written to disk surfaces via head sliders HD2–HDn through the control of a read/write control terminal R/W. As switches SW1 and SW2 are switched by the control of the main control unit 402, a timing reset unit 404 resets a clock from the signals output from the read reset unit 408 and the servoread unit 409. In FIG. 4, head slider HD1 has a configuration as shown in FIG. 3, and head sliders HD2–HDn each have a configuration as shown in FIG. 1B.

Figure 5:
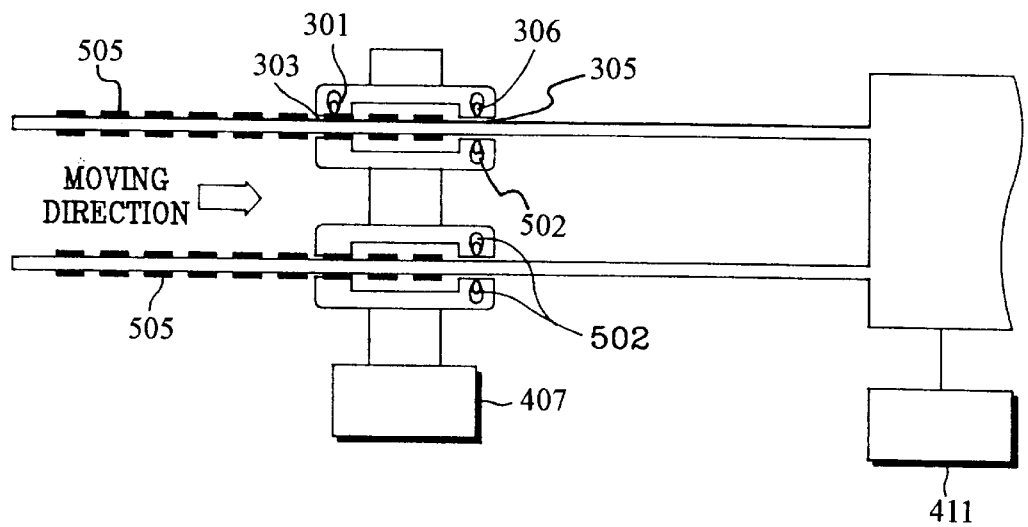
FIG. 5 illustrates a configuration for performing a servowriting operation in accordance with a first embodiment of the present invention.

FIG. 5 illustrates a configuration for performing a servowriting operation in accordance with a first embodiment of the present invention. According to this first embodiment, servo-patterns 505 previously written on outer surfaces of disks are first sensed, and then, the servo-patterns 505 are servowritten onto inner surfaces of the disks. In FIG. 5, a spindle motor 411 rotates the disks, and voice coil motor VCM 407 enables movement of the head sliders along the disk surfaces. In FIG. 5, the uppermost head slider has a configuration as shown in FIG. 3 and includes first and second coils 301 and 306 with first and second head gaps 303 and 305, respectively. The three remaining head sliders each have only one coil 502, and therefore have a configuration as shown in FIG. 1B. In accordance with the indicated direction of movement, second coil 306 of the uppermost head slider and coils 502 of the remaining head sliders serve as leading coils and perform the servowriting operation. As indicated in FIG. 5, the second coil 306 and coils 502 are co-aligned in the same vertical plane. First coil 301 serves as a trailing coil and senses the previously written servo patterns.

Figure 6:
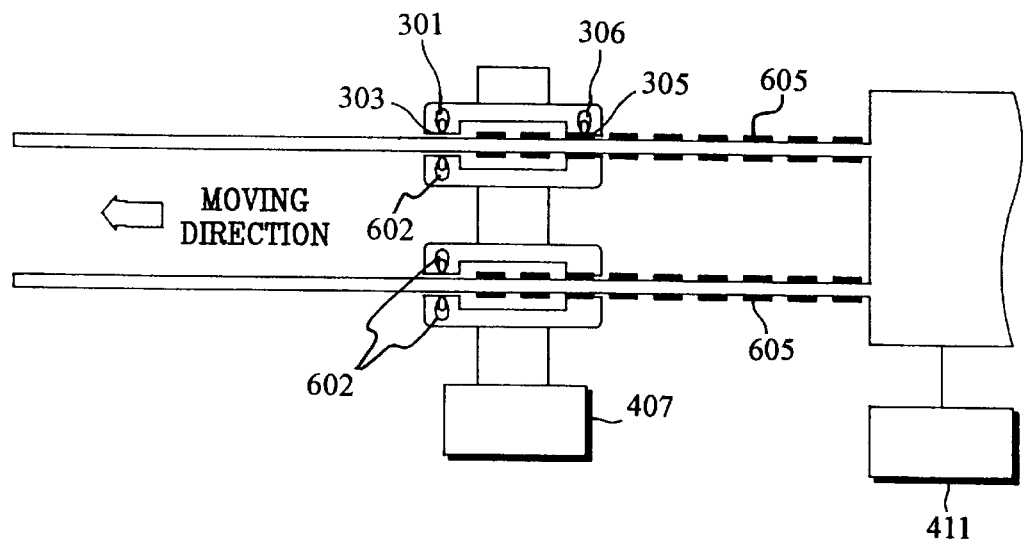
FIG. 6 illustrates a configuration for performing a servowriting operation in accordance with a second embodiment of the present invention.

FIG. 6 illustrates a configuration for performing a servowriting operation in accordance with a second embodiment of the present invention. In FIG. 6, servo-patterns 605 previously written on inner surfaces of disks are first sensed, and then, servo-patterns 605 are servowritten onto the outer surfaces of the disks. In FIG. 6, spindle motor 411 rotates the disks, and voice coil motor VCM 407 enables movement of the head sliders along the disk surfaces. In FIG. 6, the uppermost head slider has a configuration as shown in FIG. 3 and includes first and second coils 301 and 306 with first and second head gaps 303 and 305, respectively. The three remaining head sliders each have only one coil 602, and therefore have a configuration as shown in FIG. 1B. In accordance with the indicated direction of movement, first coil 301 of the uppermost head slider and coils 602 of the remaining head sliders serve as leading coils and perform the servowriting operation. As indicated in FIG. 6, the first coil 301 and coils 602 are co-aligned in the same vertical plane. Second coil 306 serves as a trailing coil and senses the previously written servo patterns.

In FIGS. 5 and 6, the direction of the servowriting operation depends upon whether the servo-pattern used as the reference for servowriting is provided on the outer surfaces of the disks, or on the inner surfaces thereof.

Hereinafter, the operation of the present invention will be described in detail with reference to FIGS. 3 to 6.

The head slider HD1 constructed as shown in FIG. 3 is connected to the servoread unit 409 of FIG. 4. In the first and second embodiments shown in FIGS. 5 and 6, respectively, the leading coils write the servo-patterns, and the trailing coil senses (i.e., reads) the servo-patterns through the servoread unit 409. The servoread unit 409 generates a servo-pattern signal that is decoded in the position decoding unit 403. The decoded output provided from position decoding unit 403 is input to the position control unit 401. In response to this input, the position control unit 401 generates position control data for a position control operation of the voice coil motor 407. The position control data generated from the position control unit 401 is converted into an analog signal through the digital-to-analog D/A converter 405, and the converted analog signal is then applied to the voice coil motor VCM driver 406 as a drive position control signal of the voice coil motor 407. The voice coil motor 407 is then driven to control the writing position of the servo pattern. Through the above-described method, the servo-pattern is continuously written by the leading coils. In addition, a precision position control system as shown in FIGS. 1A and 2, which is employed in the present invention (but not shown in FIG. 4), writes a signal amplified through pre-amplifier 410 as an original track number on the disk in the form of the servo-pattern by means of the leading coils of the head sliders HD1–HDn. The number of the track to be written to is equal to the number of the tracks corresponding to the gap distance T1 shown in FIG. 3. The servo-pattern written by the leading coils are written sufficiently to be sensed by the trailing coil. Thereafter, previously written servo-patterns are read by the servoread unit 409, and are then selfservowritten by the position control of the position control unit 401, and by the head switching control of the preamplifier 410 performed via the main control unit 402. Accordingly, the present invention avoids the need for a high-priced servowriting device.

When switch SW1 is switched off and switch SW2 is switched on, a pattern writing mode is designated. In the pattern writing mode, the pattern which had been read through read reset unit 408 from the clock head CH is written. Accordingly, the servo-pattern of data read through the servoread unit 409 is written when the switch $SW_1$ is switched on and the switch $SW_2$ is switched off.

The previously written servo-patterns are read by the trailing coil, as shown in FIGS. 5 and 6. The read servo-pattern is provided to the position control unit 401 in order to control the voice coil motor VCM 407, and thereby enable the head sliders HD1–HDn to be stopped at a given track position. The leading coils write the same servo-pattern that is read from the trailing coil on a new track. Therefore, position control needs to be precisely performed. The servo-pattern is written as many times as possible within the limit of the control. All of the written servo-patterns, except the servo-patterns required for substantial servo-control, are overwritten through the writing operation after the servowriting operation is completed.

As discussed above, the present invention provides a self-servowriting hard disk drive that eliminates the need for an expensive servowriting device. Accordingly, the present invention provides advantages in that it is capable of minimizing the cost of the hard disk drive, and is also capable of saving time, space and effort when manufacturing the hard disk drive.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A servowriting method for a hard disk drive, comprising the steps of:

detecting a servo-pattern on a first surface of a disk with a trailing coil of a first head slider positioned in opposing relation to the first surface of the disk; and writing the servo-pattern detected onto the first surface of the disk with a first leading coil of the first head slider spaced-apart from the trailing coil, while simultaneously writing the servo-pattern detected onto a second surface of the disk opposite to the first surface of the disk with a second leading coil of a second head slider positioned in opposing relation to the second surface of the disk.

2. The servowriting method as claimed in claim 1, wherein the first leading coil is spaced-apart from the trailing coil by a distance corresponding to an integer multiple of a track pitch.

3. The servowriting method as claimed in claim 2, wherein the detecting step and the writing step are performed while the first head slider and the second head slider are respectively moving in a direction along the first surface of the disk and the second surface of the disk in a direction away from a center of the disk.

4. The servowriting method as claimed in claim 2, wherein the detecting step and the writing step are performed while the first head slider and the second head slider are respectively moving in a direction along the first surface of the disk and the second surface of the disk in a direction towards a center of the disk.

5. The servowriting method as claimed in claim 1, wherein the detecting step and the writing step are performed while the first head slider and the second head slider are respectively moving in a direction along the first surface of the disk and the second surface of the disk in a direction away from a center of the disk.

6. The servowriting method as claimed in claim 1, wherein the detecting step and the writing step are performed while the first head slider and the second head slider are respectively moving in a direction along the first surface of the disk and the second surface of the disk in a direction towards a center of the disk.

7. An apparatus for performing a servowriting operation in a hard disk drive, comprising:

a first head slider having a first leading coil and a trailing coil spaced-apart from the first leading coil, the first head slider being positioned in opposing relation to a first surface of a first disk recording medium; and a second head slider having a second leading coil, the second head slider being positioned in opposing relation to a second surface of the first disk recording medium opposite to the first surface of the first disk recording medium, wherein the servowriting operation is performed by detecting a servo-pattern on the first surface of the first disk recording medium with the trailing coil, and writing simultaneously the servo-pattern detected onto the first surface of the first disk recording medium and the second surface of the first disk recording medium with the first leading coil and the second leading coil, respectively.

8. The apparatus as claimed in claim 7, wherein the first leading coil is spaced-apart from the trailing coil by a distance corresponding to an integer multiple of a track pitch.

9. The apparatus as claimed in claim 8, wherein the first head slider and the second head slider perform the servowriting operation while respectively moving in a direction along the first surface of the first disk recording medium and the second surface of the first disk recording medium in a direction away from a center of the first disk recording medium.

10. The apparatus as claimed in claim 9, wherein the first leading coil and the second leading coil are co-aligned in a same vertical plane.

11. The apparatus as claimed in claim 8, wherein the first head slider and the second head slider perform the sevowriting operation while respectively moving in the direction along the first surface of the first disk recording medium and the second surface of the first disk recording medium in a direction towards a center of the first disk recording medium.

12. The apparatus as claimed in claim 11, wherein the first leading coil and the second leading coil are co-aligned in a same vertical plane.

13. The apparatus as claimed in claim 7, wherein the first head slider and the second head slider perform the servowriting operation while respectively moving in a direction along the first surface of the first disk recording medium and the second surface of the first disk recording medium in a direction away from a center of the first disk recording medium.

14. The apparatus as claimed in claim 7, wherein the first head slider and the second head slider perform the servowriting operation while respectively moving in a direction along the first surface of the first disk recording medium and the second surface of the first disk recording medium in a direction towards a center of the first disk recording medium.

15. The apparatus as claimed in claim 7, wherein the first leading coil and the second leading coil are co-aligned in a same vertical plane.

16. The apparatus as claimed in claim 7, further comprising:
 a third head slider having a third leading coil, the third head slider being positioned in opposing relation to a first surface of a second disk recording medium, the second disk recording medium being concentrically aligned with the first disk recording medium; and
 a fourth head slider having a fourth leading coil, the fourth head slider being positioned in opposing relation to a second surface of the second disk recording medium opposite to the first surface of the second disk recording medium, the third leading coil and the fourth leading coil writing the servo-pattern detected onto the first surface of the second disk recording medium and the second surface of the second disk recording medium, respectively.

17. The apparatus as claimed in claim 16, wherein the first leading coil, the second leading coil, the third leading coil and the fourth leading coil are co-aligned in a same vertical plane.

18. The apparatus as claimed in claim 16, wherein the third leading coil and the fourth leading coil write the servo-pattern detected onto the first surface of the second disk recording medium and the second surface of the second disk recording medium, respectively, as the third head slider and the fourth head slider respectively move in a direction along the first surface of the second disk recording medium and the second surface of the second disk recording medium in a direction away from a center of the second disk recording medium.

19. The apparatus as claimed in claim 16, wherein the third leading coil and the fourth leading coil write the servo-pattern detected onto the first surface of the second disk recording medium and the second surface of the second disk recording medium, respectively, as the third head slider and the fourth head slider respectively move in a direction along the first surface of the second disk recording medium and the second surface of the second disk recording medium in a direction towards a center of the second disk recording medium.

* * * * *